United States Patent [19]
Barrett

[11] Patent Number: 5,368,914
[45] Date of Patent: Nov. 29, 1994

[54] VIBRATION-DAMPING STRUCTURAL COMPONENT

[75] Inventor: David J. Barrett, Erdenheim, Pa.

[73] Assignee: The United States of America as represented by the Secretary of the Navy, Washington, D.C.

[21] Appl. No.: 25,535

[22] Filed: Mar. 3, 1993

[51] Int. Cl.$^5$ .............................................. B32B 9/00
[52] U.S. Cl. .................................... 428/201; 428/101; 428/120; 428/125; 52/167 R; 52/167 RM; 52/167 E
[58] Field of Search ............... 428/101, 120, 125, 201; 52/67 TT, 167 R, 167 RM, 167 E

[56] References Cited

U.S. PATENT DOCUMENTS

| | | | |
|---|---|---|---|
| 1,540,045 | 6/1925 | Utzman | 428/125 |
| 1,576,142 | 3/1926 | Schumacher | 428/125 |
| 1,642,840 | 9/1927 | Clark | 428/125 |
| 1,678,959 | 7/1928 | Schumacher | 428/125 |
| 1,808,003 | 6/1931 | New | 156/40 |
| 1,808,571 | 6/1931 | Raynes | 156/42 |
| 2,240,263 | 4/1941 | Lillis | 428/125 |
| 4,121,393 | 10/1978 | Renault et al. | 52/167 E |
| 4,416,349 | 11/1983 | Jacobs | 181/208 |
| 4,761,925 | 8/1988 | Fukahori et al. | 52/167 E |
| 4,899,323 | 2/1990 | Fukahori et al. | 367/176 |
| 5,030,490 | 7/1991 | Bronowicki et al. | 428/36 |
| 5,087,491 | 2/1992 | Barrett | 428/34 |
| 5,108,802 | 4/1992 | Sattubger | 428/34 |
| 5,161,338 | 11/1992 | Tada | 52/167 R |
| 5,201,155 | 4/1993 | Shimoda et al. | 52/167 E |
| 5,233,800 | 8/1993 | Sasaki et al. | 52/167 R |

FOREIGN PATENT DOCUMENTS

| | | | |
|---|---|---|---|
| 0380304 | 8/1990 | European Pat. Off. | 52/167 E |
| 0141330 | 6/1987 | Japan | 52/167 E |
| 0248548 | 10/1990 | Japan | 52/167 E |
| 3037435 | 2/1991 | Japan | 52/167 E |
| 0158580 | 7/1991 | Japan | 52/167 E |

Primary Examiner—Patrick J. Ryan
Assistant Examiner—Kam F. Lee
Attorney, Agent, or Firm—James V. Tura; James B. Bechtel; Susan E. Verona

[57] ABSTRACT

An improvement to a vibration-damping structural component of the type having viscoelastic material sandwiched between two outer structural layers of stiffness material is disclosed. An inner layer of stiffness material having two predominant surfaces is positioned between the two outer structural layers of stiffness material and is fixed along an edge of one of the two predominant surfaces to one of the two outer structural layers of stiffness material along a line thereon corresponding to a nodal line of vibration. The remainder of the two predominant surfaces is fixed to the viscoelastic material. During flexural vibrations, the inner layer displaces in-plane with respect to the inner surfaces of the outer layers, causing greater shearing in the viscoelastic material, and therefore causing greater vibration damping in the structural component.

9 Claims, 2 Drawing Sheets

VIBRATION-DAMPING STRUCTURAL COMPONENT

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to vibration-damping, and more particularly to an improvement to a vibration-damping structural component of the type having viscoelastic material sandwiched between two outer structural layers of stiffness material.

Various load-bearing systems and structures, such as aircraft, experience vibrations during use which cause them to suffer from high-cycle and resonant fatigue and reduced service life. One means for reducing such vibrations is to use viscoelastic material, which converts vibrations into heat when strained. Often a free layer of viscoelastic material is fixed to the surface of the base structure. When the base structure is subjected to bending or flexural loads, the viscoelastic layer strains in tension and compression. An additional stiffness layer may also be fixed to the outer surface of the viscoelastic layer as a constraining layer. Under these circumstances, the bending or flexural loads deform the structure and the constraining layer, loading the viscoelastic material in shear, a more effective damping mode for viscoelastic materials.

Another approach to damping vibrations is to construct the structure itself from a vibration-damping laminated composite having two constraining layers of stiffness material and a damping layer of viscoelastic material sandwiched therebetween. Under bending loads the viscoelastic layer is loaded in shear to absorb the vibrational energy. Most of the shear of the viscoelastic layer occurs at the ends of the mode shapes of the dominant vibrational mode. At the peaks of the mode shape for the dominant mode there are "dead" areas of viscoelastic material which do not shear at all. Since maximum vibration damping takes place when maximum shearing occurs in the viscoelastic material, it is desirable to increase the rate or amount of shear straining therein.

SUMMARY OF THE INVENTION

It is therefore an object of the present invention to provide an improvement to a vibration-damping structural component of the type having viscoelastic material sandwiched between two outer structural layers of stiffness material.

It is yet another object to provide a structural component with increased resistance to vibratory loads.

It is still another object to provide a laminated structural component which experiences a greater rate of shear strain in the viscoelastic damping layer thereof.

These and other objects of the invention are accomplished by an improvement to a vibration-damping structural component of the type having viscoelastic material sandwiched between two outer structural layers of stiffness material. The improvement comprises an inner layer of stiffness material having two predominant surfaces, which is positioned between the two outer structural layers of stiffness material and fixed along an edge of one of the two predominant surfaces to one of the two outer structural layers of stiffness material, and having the remainder of the two predominant surfaces fixed to the viscoelastic material.

Other objects, advantages, and novel features of the invention will become apparent from the following detailed description of the invention when considered in conjunction with the accompanying drawings.

DESCRIPTION OF THE PREFERRED EMBODIMENT

Figure 1:
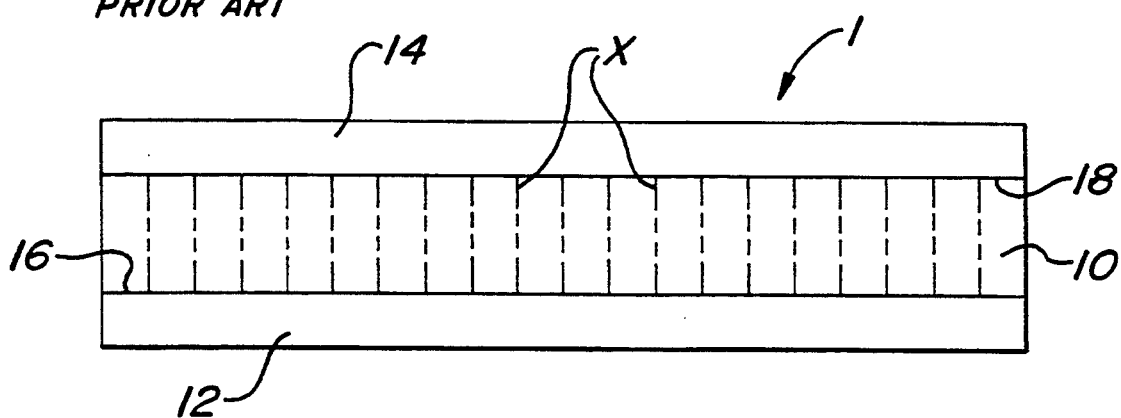
FIG. 1 is a side view schematic illustration of a prior art vibration-damping structural component of the type having viscoelastic material sandwiched between two outer structural layers of stiffness material.

Referring now to the drawings wherein like characters represent like or corresponding parts throughout the several views, one sees in FIG. 1 a schematic illustration of a prior art vibration-damping structural component or laminated composite 1 of the type having viscoelastic material 10 sandwiched between two outer structural layers 12 and 14 of stiffness material, showing the distance between the outer layers magnified. Lines x diagrammatically connect transversely adjacent points on the inner surfaces 16 and 18 of outer structural layers 12 and 14, respectively, when the laminated composite is not subjected to any bending loads.

Figure 2:
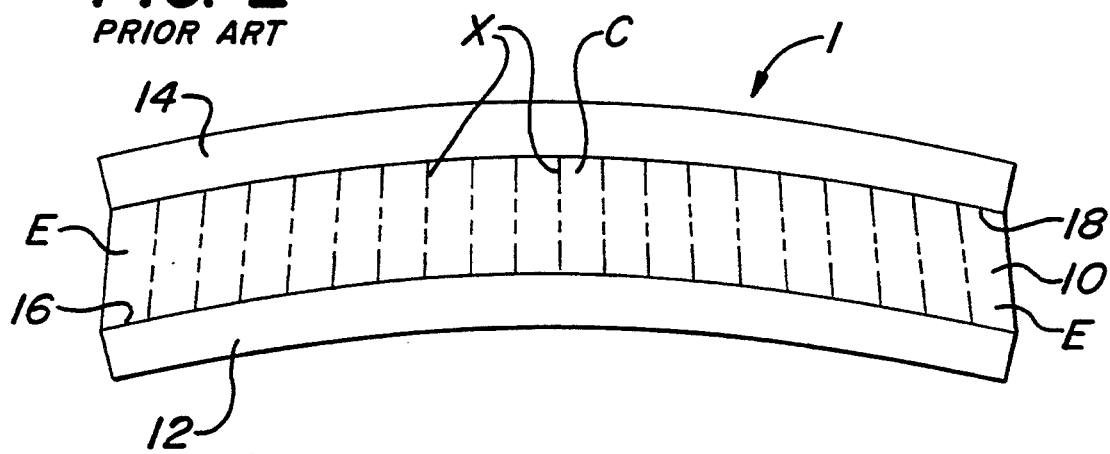
FIG. 2 is a side view schematic illustration of the prior art component of FIG. 1 under a bending load such as it would experience being vibrated in the fundamental mode.

FIG. 2 schematically illustrates prior art composite 1 of FIG. 1 under a bending load such as it would experience being vibrated in the fundamental mode. Inner surfaces 16 and 18 of outer structural layers 12 and 14 displace in-plane with respect to each other, as shown by lines x, causing viscoelastic material 10 to shear. The most shearing occurs at the nodal lines or ends E of the bend or mode shape, where the most relative in-plane displacement of inner surfaces 16 and 18 occurs and the least transverse displacement of composite 1 occurs. The amount of shear decreases towards the middle or center C of the mode shape, where the maximum transverse displacement of composite 1 occurs, but where the minimum relative in-plane displacement of inner surfaces 16 and 18 occurs. At the very center C of the bend or mode shape no in-plane displacement occurs, and therefore no shearing of viscoelastic material 10 occurs at all.

Figure 3:
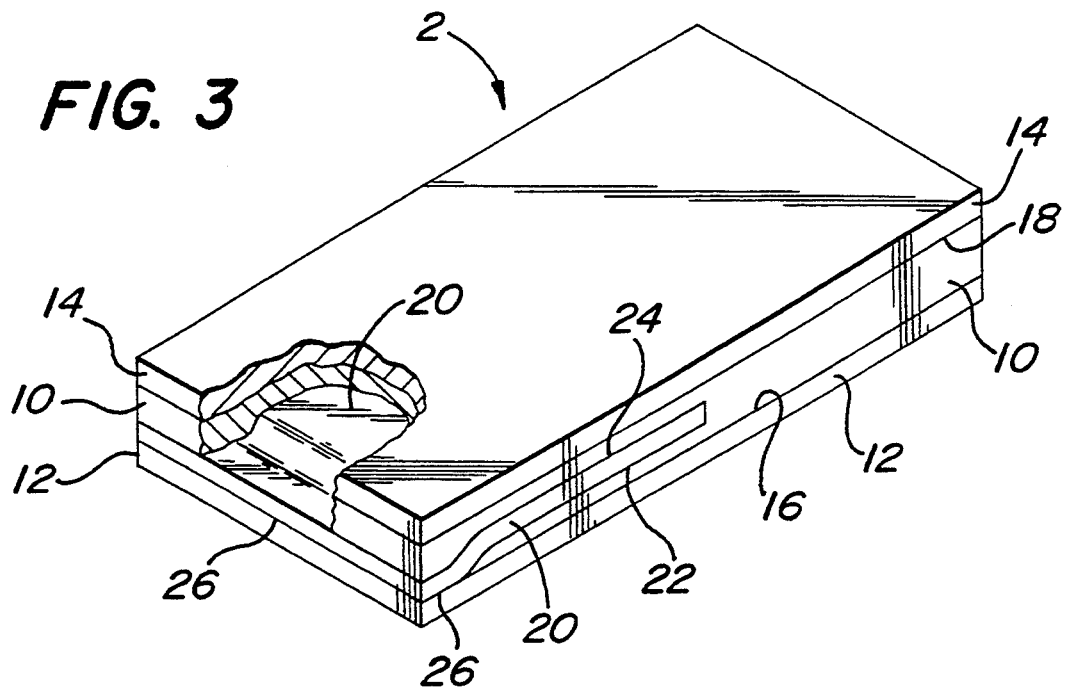
FIG. 3 is a perspective-view schematic illustration of the improved vibration-damping structural component of the present invention.
Figure 4:
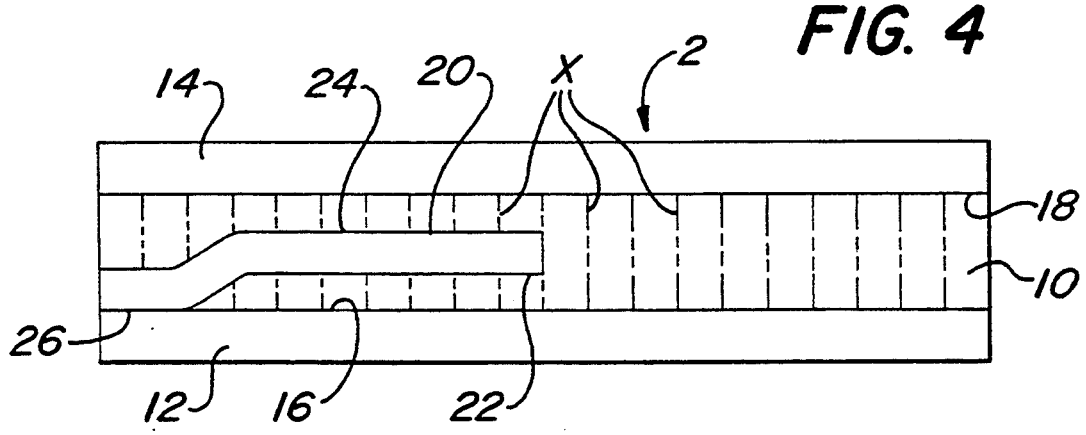
FIG. 4 is a side view schematic illustration of the improved vibration-damping structural component shown in FIG. 3.

FIGS. 3 and 4 schematically illustrate an improved vibration-damping structural component or laminated composite 2 according to the present invention. Viscoelastic material 10 is sandwiched between two outer structural layers 12 and 14 of stiffness material having, respectively, inner surfaces 16 and 18. The distance between outer layers 12 and 14 is shown magnified. An inner layer 20 of stiffness material having two predominant surfaces 22 and 24 is positioned between outer structural layers 12 and 14 and is fixed along an edge 26 of one predominant surface 22 to inner surface 16 of one outer layer 12. The remainder of predominant surfaces 22 and 24 is fixed to viscoelastic material 10. Lines x diagrammatically connect transversely adjacent points on inner surfaces 16 and 18 of outer structural layers 12 and 14 and predominant surfaces 18 and 20 of inner layer 20 when laminated composite 2 is not subjected to any bending loads.

Figure 5:
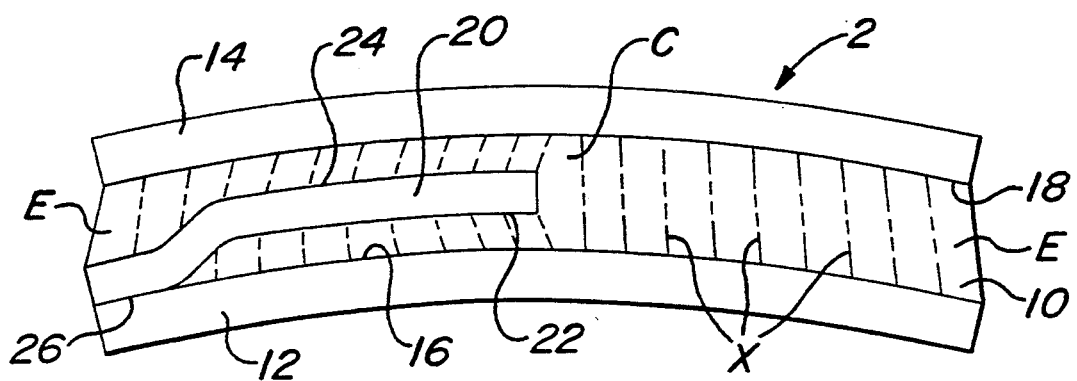
FIG. 5 is a side view schematic illustration of the improved component of FIG. 4 under the same bending load as the prior art component shown in FIG. 2.

FIG. 5 schematically illustrates improved composite 2 of FIG. 4 under the same bending load as prior art composite 1 shown in FIG. 2. Inner stiffness layer 20 is shown fixed by edge 26 to inner surface 16 of outer structural layer 12 along a nodal line or end E of a mode shape and extending along the length of composite 2 in the direction of the wave of vibration a distance equal to approximately one-half of the mode shape or one-half the distance between ends E of the mode shape, which is; and one-quarter of the wavelength of the fundamental mode. Inner surfaces 16 and 18 displace with respect to each other, just as they do in prior art composite 1, the amount of displacement of each along its length decreasing to zero towards the center C of the mode shape. Additionally, however, inner layer 20 displaces with respect to both inner surfaces 16 and 18, causing further shearing of viscoelastic material 10, as shown by lines x. Inner layer 20 is fixed to inner surface 16 in the region of greatest in-plane displacement of inner surface 16. Due to the low resistance to movement provided by viscoelastic material 10, inner layer 20 moves therethrough without elongating in tension, and therefore displaces equally along its entire length the same distance as the greatest displacement of inner surface 16. Since the distance inner surface 16 displaces decreases along its length approaching the center C of the mode shape, the relative in-plane displacement between inner layer 20 and inner surface 16 increases towards the center of the mode shape. Because inner layer 20 displaces as much towards the center C of the mode shape as it does near the node at end E, it also has greater in-plane displacement with respect to inner surface 18 of outer layer 14 than does inner surface 16 of outer layer 12, which does not displace at all at the center. Hence, whereas in prior art composite 1 no shearing takes place in the center C of the mode shape, there is shearing in the center C of the mode shape in improved composite 2. A second inner layer (not shown) can be added along the other nodal line or end E of the mode shape shown in FIG. 4.

The following guidelines should be considered in making an improved composite 2 according to the invention, bearing in mind general design principles and the specific needs of the application. As discussed above, inner layer 20 should be attached along or near a nodal line or end E of the mode shape of what is anticipated will be the dominant mode of vibration in composite 2. The nodal line or end E is the location of maximum in-plane displacement of inner surface 16 of outer layer 12, and therefore inner layer 20 will have the most in-plane displacement if it is attached along this line. Inner layer 20 should preferably extend to about the midpoint or center C of the mode shape, or about one-quarter of the wavelength of the dominant vibrating mode. This provides the maximum benefit because it allows inner layer 20 to affect the otherwise dead middle area or center of the mode shape. Edge 26 should constitute approximately one-tenth the surface area of predominant surface 22. In other words, inner layer 20 should be fixed to inner surface 16 of outer layer 12 along about one-tenth of the distance which it extends into viscoelastic material 10. Inner layer 20 should preferably be positioned approximately midway between outer layers 12 and 14, with equal amounts of viscoelastic material 10 on each side thereof, although specific applications may dictate doing otherwise. The thickness of each outer layer 12 and 14 is dictated by the needs of the application, just as in the case of prior art composite 1. The amount of viscoelastic material 10 between outer layers 12 and 14 can be the same as found in prior art composite 1. The overall distance will of course be greater due to the additional thickness added by inner layer 20, which should be as thin as possible, while still being stiff enough to shear viscoelastic material 10. The overall thickness of composite 2 should preferably be less than one-tenth of its length (the length being the dimension which is parallel to the wavelength of the dominant vibrating mode.)

The viscoelastic and stiffness materials can be the same as those commonly used in prior art vibration-damping laminated composite structures. For example, outer layers 12 and 14 may be an advanced composite such as graphite-epoxy, metal, wood, plastic, or ceramic. Inner layer 20 may be, for example, graphite-epoxy, kevlar, or glass-epoxy. Suitable viscoelastic materials include acrylic polymers, elastomers, polymerics, and thermoplastics. The needs of the particular application will dictate the selections.

Standard structural sandwich fabrication techniques can be used to make the improved laminated composite 2 of the present invention. One improved laminated composite 2 using graphite-epoxy for outer layers 12 and 14 and inner layer 20 can be made in the following manner. Using standard hand lay-up techniques, plies of graphite-epoxy of the appropriate length and width, for example 20 inches by 10 inches, are stacked until the desired thickness, for example 36 mils, for outer layer 12 is achieved. The fiber orientation of each ply can be positioned during stacking to meet the needs of the particular application. Viscoelastic material in the form of acrylic polymer film of the desired thickness, for example 5 mils, is then adhered to all of inner surface 16 of outer layer 12 except that portion, for example 1 inch by 10 inches, to which edge 26 of inner layer 20 is to be fixed. One or more plies of graphite-epoxy totalling, for example, 5 mils, having the length and width appropriate for inner layer 20, for example, 10 inches by 10 inches, are then stacked to the desired thickness over that portion of inner surface 16 which is exposed and the adjacent viscoelastic material 10. The graphite fibers of the plies should all be predominantly aligned in parallel to the length of composite 2. More viscoelastic material 10 of the desired thickness, for example 5 mils, is applied to cover inner layer 20 and the exposed part of the already-laid-up viscoelastic material 10. Finally, more plies of graphite-epoxy are stacked with the desired fiber orientation and to the desired thickness, for example 36 mils, to form outer layer 14 over viscoelastic material 10. The laminate thus produced is heated under pressure in an autoclave to consolidate it. During this co-curing process, the independently laid-up viscoelastic films form a continuous layer in the area where they were in direct contact.

Some of the many advantages and novel features of the invention should now be apparent. For instance, an improvement to a vibration-damping structural component of the type having viscoelastic material sandwiched between two outer structural layers of stiffness material has been provided. The structural component experiences a greater rate of shear strain in the viscoelastic damping layer thereof, giving it increased resistance to vibratory loads.

Those skilled in the art will appreciate that many modifications and variations are possible to the above-disclosed improvement to a vibration-damping structural component. For example, a plurality of inner layers 20 may be positioned between outer structural layers 12 and 14, one along each nodal line or end E of what is anticipated will be the dominant mode of vibration. Some of inner layers 20 can be fixed to outer layer 12 while others are fixed to outer layer 14. The concept of the present invention can be incorporated into structural components such as hat-stiffened plates, with inner layers 20 being positioned in the legs thereof. Within the concept of the present invention, one of the outer structural layers may be a base structure. Some benefit may also be obtained by fixing inner layers to a base structure having only a viscoelastic layer attached thereto and no outer constraining layer. The structural component incorporating the improvement of the present invention may comprise a plurality of alternating layers of structural material and viscoelastic material. It should be understood that all these and other modifications and variations fall within the scope of the following claims.

What is claimed is:

1. A laminated composite capable of damping a given known mode of vibration, comprising:

two outer structural layers of stiffness material positioned essentially parallel to each other;

viscoelastic material sandwiched between said two outer structural layers of stiffness material; and an inner layer of stiffness material having two predominant surfaces, positioned between said two outer structural layers of stiffness material and fixed along an edge of one of the two predominant surfaces thereof to one of said two outer structural layers of stiffness material, and having the remainder of the two predominant surfaces fixed to the viscoelastic material.

2. The laminated composite of claim 1, wherein the edge is fixed to one of said two outer structural layers of stiffness material along a linear portion thereof corresponding to a node of the vibration.

3. The laminated composite of claim 2, wherein said inner layer is sized to extend half of the distance between nodes of the vibration.

4. The laminated composite of claim 1, wherein the surface area of the edge is one-tenth of the surface area of one of the predominant surfaces.

5. The laminate composite of claim 1, wherein the stiffness material is graphite-epoxy.

6. The laminated composite of claim 1, wherein the viscoelastic material is an acrylic polymer.

7. The laminated composite of claim 2, wherein the surface area of the edge is one-tenth of the surface area of one of the predominant surfaces.

8. The laminated composite of claim 2, wherein the stiffness material is graphite-epoxy.

9. The laminated composite of claim 2, wherein the viscoelastic material is an acrylic polymer.

* * * * *